United States Patent [19]
Watanabe

[11] 4,271,525
[45] Jun. 2, 1981

[54] ADAPTIVE DIVERSITY RECEIVER FOR DIGITAL COMMUNICATIONS

[75] Inventor: Kojiro Watanabe, Tokyo, Japan
[73] Assignee: Nippon Electric Co., Ltd., Tokyo, Japan
[21] Appl. No.: 121,771
[22] Filed: Feb. 15, 1980
[30] Foreign Application Priority Data
Feb. 21, 1979 [JP] Japan .................................. 54-19367
[51] Int. Cl.³ ........................ H04L 1/02; H04B 1/12
[52] U.S. Cl. ..................................... 375/14; 375/100
[58] Field of Search ..................... 375/14, 15, 96, 100, 375/101; 333/18; 364/724; 455/137, 138

[56] References Cited
U.S. PATENT DOCUMENTS 3,879,664  4/1975  Monsen ................................. 375/14
4,112,370  9/1978  Monsen ............................... 375/100

Primary Examiner—Jin F. Ng
Attorney, Agent, or Firm—Sughrue, Rothwell, Mion, Zinn and Macpeak

[57] ABSTRACT

An adaptive diversity receiver for digital communications provides a plurality of transversal filters disposed in front of a linear combiner for each of a plurality of diverse channels. The tap gains of each of the transversal filters are updated to estimate the sampled values of the channel impulse response for each diverse channel as a function of the detected data output, rather than providing tap gain updating as a function of the data error signal. In this manner, each transversal filter operates as an adaptive match filter for the corresponding diversity channel.

5 Claims, 5 Drawing Figures

ADAPTIVE DIVERSITY RECEIVER FOR DIGITAL COMMUNICATIONS

BACKGROUND OF THE INVENTION

This invention relates to an adaptive diversity receiver for digital communications and, more particularly, to a receiver capable of automatically estimating the characteristics of transmission channels and adaptively providing optimum receiver characteristics.

Diversity receivers have been used extensively in reducing fading in communication. However, in the presence of frequency selective fading, deep notches are formed in the transmission frequency band resulting in deteriorated transmission performance and transmission errors.

One solution to this problem is proposed in U.S. Pat. No. 3,879,664 to Monsen which discloses an adaptive diversity receiver using a decision feedback automatic equalizing technique, as illustrated in FIG. 1. Such a conventional receiver is generally satisfactory in steady state. However, since the receiver is designed to control tap gains of a plurality of adaptive forward transversal filter equalizes 13 to minimize an error signal produced from the combined output of these equalizers, it consequently requires a very long period of time for each tap gain to assume an optimum value. This may be shown by the fact that the eigenvalues of a coefficient matrix in a simultaneous linear equation are diversified for determining optimum tap gains. A detection error produced in a data detector and error generator 16 is fed through modulator 20 to the equalizers 13 which offset such an error signal before the tap gains of these equalizers may be updated. The equalizers thus fail to provide optimum adaptive equalization.

SUMMARY OF THE INVENTION

An object of the present invention is to provide an adaptive diversity receiver free from the above-mentioned disadvantages in the prior art receiver.

According to one aspect of this invention an adaptive diversity receiver is provided which comprises a plurality of transversal filters disposed in front of a linear combiner for each of a plurality of diversity channels. Tap gains of each filter are updated so as to estimate sampled values of a baseband equivalent impulse response (referred to as channel impulse response) for each diversity channel, instead of providing the least mean square of the error signal. In this manner, each transversal filter constitutes an adaptive matched filter for the corresponding diversity channel. The outputs of the transversal filters are subjected to linear combining to realize optimum reception to therefore provide the maximum signal-to-noise ratio. The linear-combined output is cascade-connected to an adaptive decision feedback equalizer comprising one adaptive forward transversal filter equalizer and one adaptive backward transversal filter equalizer to eliminate intersymbol interference.

Further, the adaptive forward transversal filter equalizer in accordance with the present invention is disposed at the single output of the combiner 14 and is controlled by one error signal. Therefore, the present invention eliminates the tap gain adjustment for a plurality of adaptive forward transversal filter equalizers.

BRIEF DESCRIPTION OF THE DRAWINGS

This invention is hereunder described in greater detail by reference to the accompanying drawings, in which.

In the drawings, a signal path indicated by a thick line represents a complex signal, and a signal path indicated by a thin line represents a real signal, and like numerals identify like structural elements.

DETAILED DESCRIPTION OF THE INVENTION

Figure 1:
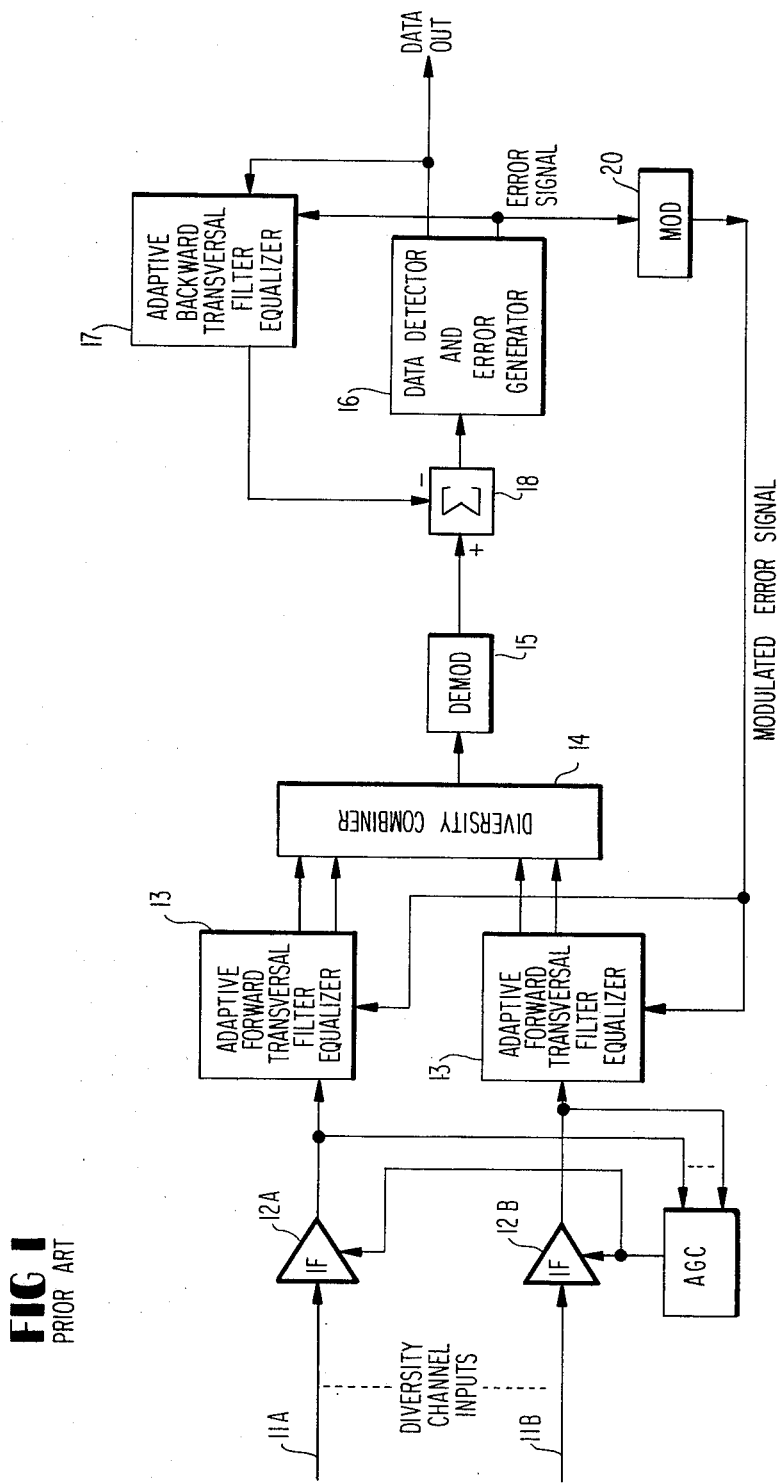
FIG. 1 is a block diagram showing the conventional receiver described above.

Referring to FIG. 1, the conventional receiver has a plurality of adaptive forward transversal filter equalizers 13 disposed for each of a plurality of diversity channels 11, and the outputs of the equalizers are fed to a linear combiner 14 for linear combining thereof. The linearly combined signal is demodulated in a demodulator 15. The demodulated baseband signal is applied to a subtractor 18 where the output signal of an adaptive backward transversal filter 17 is subtracted from the baseband signal to produce an equalized signal. The equalized signal is supplied to the input of a data detector and error generator 16 which provides a detected data output. The data detector and error generator 16 also takes the difference between the equalized signal and the detected data to produce an error signal. The error signal is not only used to update tap gains of the adaptive backward transversal filter 17 but also is modulated in a modulator 20 and used in updating tap gains of said equalizer 13. Such tap gain updating is performed so as to provide the least mean square of the error signal.

Figure 2:
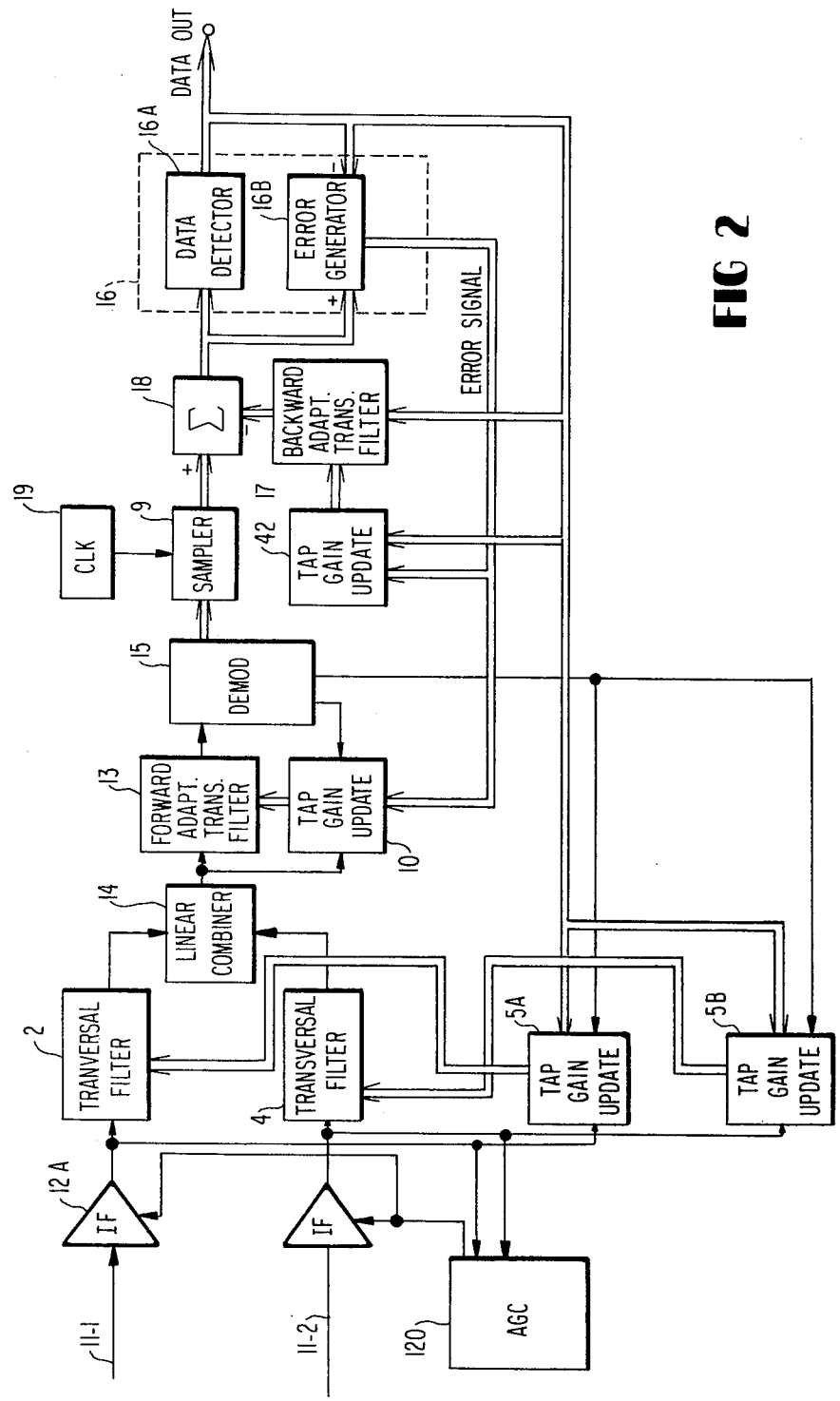
FIG. 2 is a block diagram showing one embodiment of this invention.

FIG. 2 illustrates one embodiment of the present invention for diversity reception and includes diversity channels 11-1 and 11-2, intermediate frequency amplifiers 12A and 12B, an automatic gain controller (AGC) 120, transversal filters 2 and 4, tap gain updating circuits 5A, 5B, 10 and 42, a linear combiner 14, an adaptive forward transversal filter equalizer 13, a demodulator 15, a sampler 9, a timing system 19, a subtractor 18, an adaptive backward transversal filter equalizer 17, and a data detector and error generator 16.

The combination of the transversal filters 2 and 4 and tap gain updating circuits 5A and 5B constitute adaptive matched filters, respectively. The adaptive forward transversal filter equalizer 13, adaptive backward transversal filter equalizer 17, subtractor 18, tap gain updating circuits 10 and 42 constitute an adaptive decision feedback equalizer.

The operation of the FIG. 2 embodiment will now be described. Two diversity signals, or linearly-modulated (e.g. phase modulated) signals, are received by two antennas (not shown) and supplied to the intermediate frequency amplifiers 12A and 12B through the space diversity channels 11-1 and 11-2, respectively. The AGC 120 controls the gains of both amplifiers 12A and 12B by reference to the maximum power of the received signals. This causes the received signal level to be set within a dynamic range of the linear combiner 14. The AGC 120 can be operated in the same manner as described in column 4, lines 34-57 of the above-cited U.S. Pat. No. 3,879,664, the entire disclosure of which is hereby incorporated by reference. The signals amplified by the amplifiers 12A and 12B are supplied through the transversal filters 2 and 4 to the linear combiner 14 where they are subjected to the optimum diversity combining operation. The output of the combiner 14 is fed to the adaptive forward transversal filter equalizer 13, thereby eliminating intersymbol interference. The output of the equalizer 13 is phase-detected by the demodulator 15 and demodulated. The demodulator baseband signal is sampled in the sampler 9 by a clock pulse having a symbol interval period of T seconds supplied from the timing system 19 and then fed to the subtractor 18 where a feedback signal supplied from the adaptive backward transversal filter equalizer 17 is subtracted from the sampled signal, thereby eliminating intersymbol interference. The output of the subtractor 18 is detected by a data detector 16A of the data detector and error generator 16, and an estimated value of the transmitted data is obtained at the DATA OUT terminal as the output of the receiver. Intersymbol interference due to frequency selective fading has little effect on the value of the final DATA OUT signal.

Tap gains of the transversal filter 2 are updated by the tap gain updating circuit 5A whose three inputs are the detected data, the signal incoming from IF amp 12A and a sinusoidal signal (in phase coherence with the carrier phase of the input phase modulated wave) generated by a voltage controlled oscillator (VCO) of the demodulator 15 shown in FIG. 3. In a similar manner, tap gains of the transversal filter 4 are updated by the tap gain updating circuit 5B having inputs from IF amp 12A, demodulator 15, and data detector 16A. The arrangement of each of the transversal filters is the same as the one illustrated in FIG. 2 of the above-referenced U.S. Patent except that the filters 2 and 4 used in the present invention receive a weight adaptation control signal from the tap gain updating circuits 5A and 5B, respectively, rather than by calculating the control signal within filters 2 and 4.

Figure 3A:
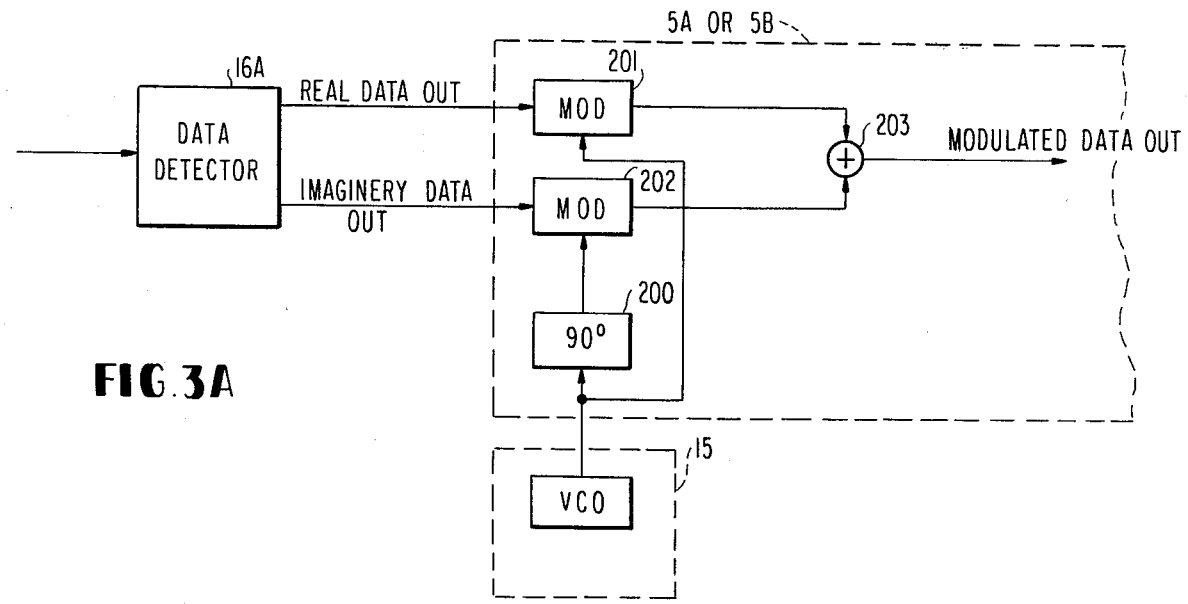
FIGS. 3A to 3C are tap gain updating circuits 5A or 5B for use in one embodiment of this invention.
Figure 3B:
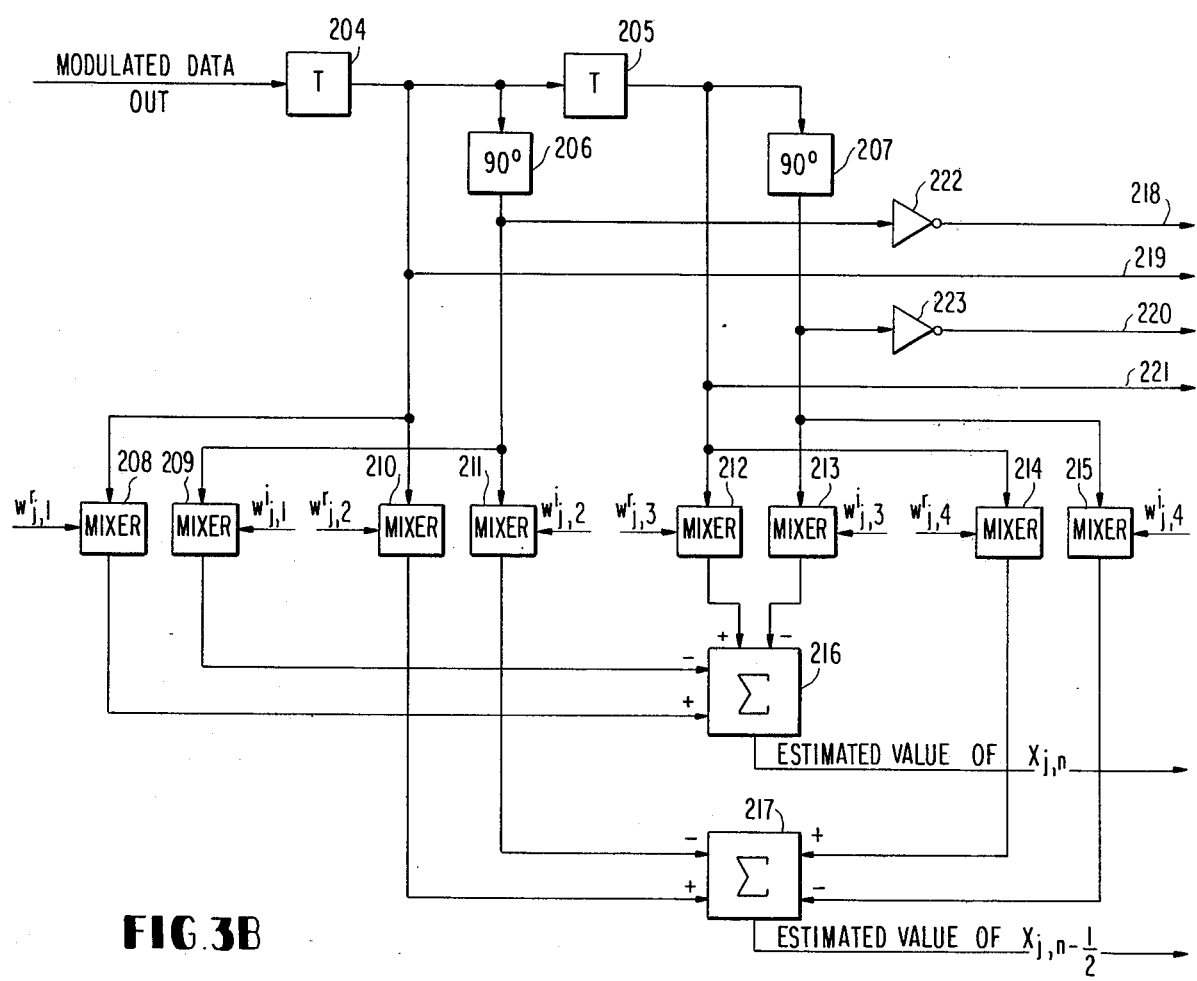
Figure 3C:
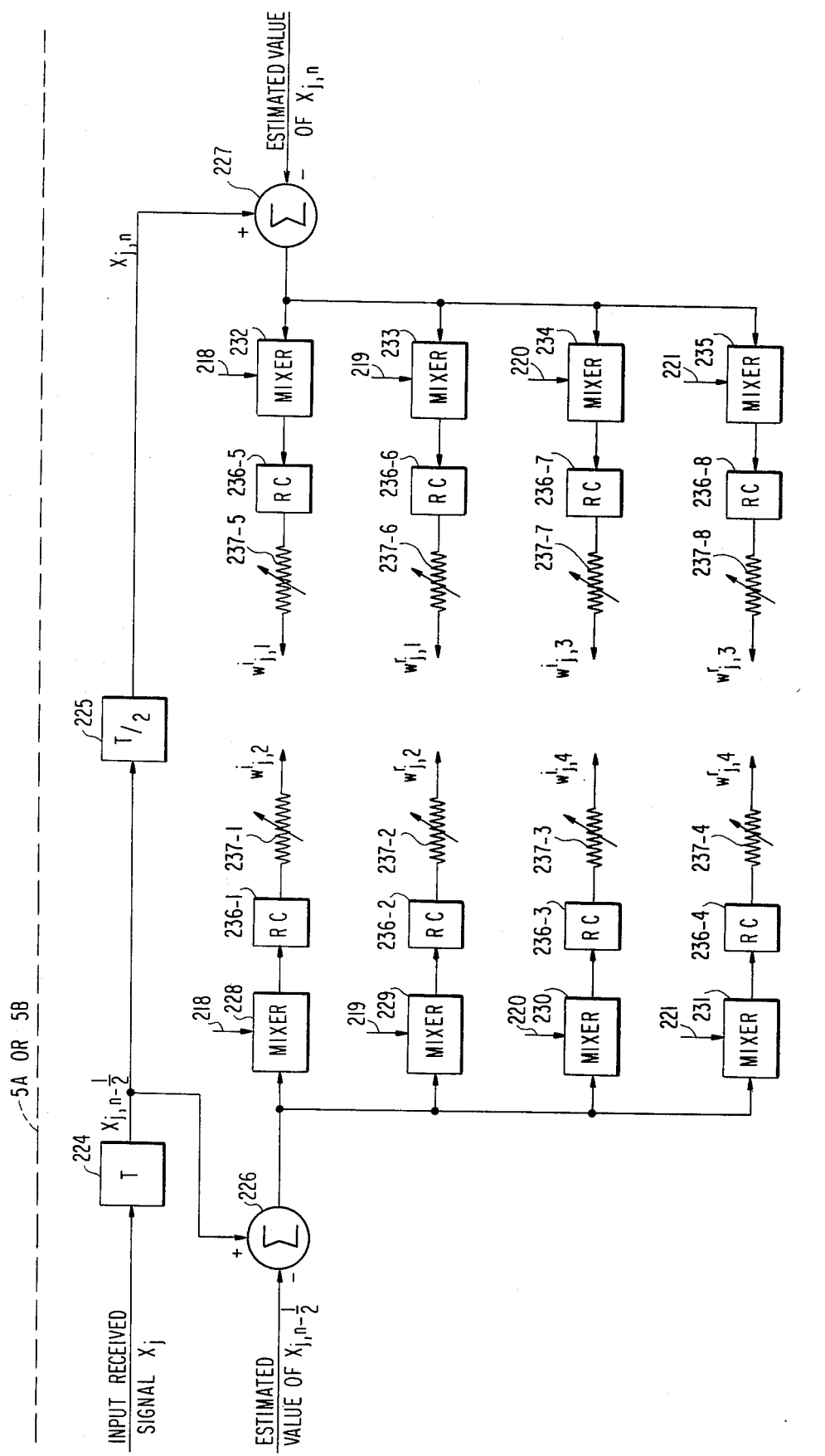

The arrangement and operation of the tap gain updating circuits 5A and 5B are described in detail referring to FIGS. 3A through 3C. It will be assumed that each updating circuit has four taps. The real and imaginary components of the detected data output signal from the data detector and error generator 16 are shown in FIG. 3A and are supplied to modulators 201 and 202, respectively. In the modulator 201, the real component phase-modulates a sinusoidal signal generated from the VCO of the demodulator 15, and in the modulator 202, the imaginary component phase-modulates a sinusoidal signal supplied from a 90° phase shifter 204 and is 90° out of phase with the sinusoidal signal applied to the modulator 201. The outputs of the modulators 201 and 202 are summed in an adder 203, producing a modulated data output.

The modulated detection data is fed to T-second delay element 204 of FIG. 3B and is further delayed in T-second delay element 205. Thus, the delayed modulated data output is convolved with the even- and odd-numbered tap gains of the filters 2 and 4. In the following description, the tap gain w has a first subscript j representing a particular diversity channel, superscripts r or i to indicate the real or imaginary portions of the tap gain, and a second subscript to identify one of the four tap gains for each diversity channel. The output of the delay element 204 is supplied to a mixer 208 where it is multiplied by the real component, $w_{j,1}^r$, of the first tap gain; the output of the delay element 205 is supplied to a mixer 212 where it is multiplied by the real component, $w_{j,3}^r$, of the third tap gain; the signal from a 90° phase shifter 206 which is 90° out of phase with the output of the delay element 204 is supplied to a mixer 209 where it is multiplied by the imaginary component $w_{j,1}^i$, of the first tap gain; and the signal from a 90° phase shifter 207 which is 90° out of phase with the output of the delay element 205 is supplied to a mixer 213 where it is multiplied by the imaginary component, $w_{j,3}^i$, of the third tap gain. The outputs of the mixers 208 and 212 are summed in an accumulator 216, whereas the outputs of the mixers 209 and 213 are fed to an accumulator 216 where they are subtracted from the summed outputs of the mixers 208 and 212. Convolution by the even-numbered tap gains is likewise implemented using mixers 210, 211, 214, and 215 and a second accumulator 217. The output of the accumulator 216 provides an estimated value of a sampled value $X_{j,n}$ of an input reception signal $X_j$ at time n, whereas the output of the accumulator 217 provides an estimated value of a sampled value $X_{j,n\frac{1}{2}}$ of the input reception single $X_j$ at time $n\frac{1}{2}$.

As shown in FIG. 3C, the output of the accumulator 217 or the estimated value $X_{j,n\frac{1}{2}}$ is compared in an adder 226 with the signal $X_{j,n\frac{1}{2}}$ obtained by delaying the input signal $X_j$ in a delay element 224 by a time $\tau$ equal to the time delay from the supply of IF input data at amps 12, to the estimation of $X_{j,n\frac{1}{2}}$ from accumulator 217, and the adder 226 produces a difference signal. In a like manner, the output of the accumulator 216 or the estimated $X_{j,n}$ is compared in an adder 227 with the signal $X_{j,n}$ obtained by delaying the output of the delay element 224 in a one-half symbol period delay element 225, and the adder 227 produces another difference signal. These difference signals represent how close channel impulse response sampled values are approximated by the tap gains, and by obtaining the least mean square of the se difference signals, rather than the error signal output as taught in the above-cited Patent reference, the transversal filters 2 and 4 constitute matched filters. The least mean square is obtained by the following procedure. The output signal of the adder 226 of FIG. 3C is supplied to mixers 228 through 231 where it is multiplied by signals produced in the arrangement of FIG. 3B by way of inverters 222 and 223 and lines 218 through 221. Each product is low-pass filtered through RC filters 236-1 to 236-4 then suitably weighted in variable resistors 237-1 to 237-4 to provide even-numbered tap gains. At the same time, the output signal from adder 227 and the signals from lines 218 to 221 are used to provide odd-numbered tap gains in mixers 232 to 235, RC filters 236-5 to 236-8, and variable resistors 237-5 to 237-8.

It should be noted that it is the adaptive forward filter equalizer 13 of FIG. 2 of the referenced patent in which delay elements having a delay time of T/2 are used to prevent deterioration in equalizer performance due to a difference in timing phase supplied by the timing system 19, whereas in the present invention, the transversal filters 2 and 4 have the T/2 delay elements and constitute adaptive matched filters. As a result, the adaptive equalizer 13 need not perform the equalization of distortion caused by such a timing phase difference, thereby allowing the use of delay element having a delay time of T.

Updating of the tap gains of the equalizer 13 is achieved by the tap gain updating circuit 10 whose inputs are (i) are modulated error signal consisting of an error signal supplied from a subtractor in error generator 16B which produces the difference between the input and output signals of the generator 16, (ii) the sinusoidal signal generated by the demodulator 15, and (iii) the output signal of the linear combiner 14. The construction and operation of the equalizer 13 may be the same as those specified in FIG. 2 of the above-cited U.S. Patent, except that the delay elements 21 of FIG. 2 of the Patent, having a delay time of T/2, are replaced by delay elements having a delay time of the full symbol interval T. Furthermore the output of the combiner 14 used in the present invention is supplied to the equalizer 13 and the output of the equalizer 13 is supplied to the demodulator 15. The tap gains of the equalizer 17 are updated by a tap gain updating circuit 42 whose inputs are the detected data and the error signal supplied from the generator 16. The construction and operation of the tap gain updating circuit 10 is the same as that illustrated in FIG. 6 of the above-mentioned Patent except that the input signal $X_{j,i}$ from the AGC RECEIVER shown in FIG. 6 is replaced by the output of the linear combiner 14, and that the sinusoidal signal from the local oscillator 33 of FIG. 5 (corresponding to the VCO of FIG. 3A of the invention) is omitted in FIG. 6 of the Patent. The construction and operation of the tap gain updating circuit 42 are also the same as that illustrated in FIG. 7 of the Patent. The elements 15, 9, 18, 16A, 16B, 17 and 120 described herein can be comprised of circuits shown in FIG. 3, FIG. 4 (38, 39), FIG. 4 (18A, 18B), FIG. 5 (45, 46), FIG. 5 (47, 48), FIG. 8, and FIG. 11 of the Patent respectively.

The weights for the taps of the filter equalizers 13 and 17 are respectively determined using the well-known equations (12a) and (12b) given under page 1161 of the article by David D. Falconer, entitled "Application of Passband Decision Feedback Equalization in Two-Dimensional Data Communication Systems," IEEE TRANSACTIONS ON COMMUNICATIONS, VOL. COM-24, NO. 10, pp. 1159–1166, October issue, 1976.

While the operation and construction of a space diversity receiver has been described above, it is to be understood that this invention is also applicable to frequency diversity reception as well as to space diversity reception combined with frequency diversity reception. The dual diversity reception of the illustrated embodiment can be expanded to multiple diversity reception of M separate diversity channels without any change in circuit configuration other than the use of M transversal filters and tap gain updating circuits. Another possible embodiment of this invention would be to supply the transversal filters and adaptive forward transversal filter equalizer with a baseband signal obtained by modulating the receive signal.

What is claimed is:

1. An adaptive diversity receiver for digital communication for processing transmitted data signals received in a plurality of diversity channels to minimize interference caused between symbols constituting said data signals, said receiver comprising:
   a plurality of transversal filters for receiving said data signals, each of said transversal filters having tap gains, and each of said transversal filters corresponding to one of said diversity channels;
   means for linearly combining the outputs of said transversal filters to provide a combined output;
   a decision feedback equalizer having tap gains, said equalizer minimizing said interference and responsive to said combined output to provide an equalized output;
   means responsive to said equalized output for producing detected data representing an estimated value of said transmitted data;
   means for updating said tap gains of said transversal filters, responsive to said detected data and said data signals from said diversity channels so as to provide an adaptive matched filter for each of said diversity channels; and
   means responsive to said detected data and said equalized output of said decision feedback equalizer, for updating said tap gains of said decision feedback equalizer.

2. The receiver of claim 1 wherein said means for updating said tap gains of said transversal filters comprise:
   modulating means for modulating said detected data in phase quadrature to provide modulated data;
   means delaying said modulated data for providing delayed modulated data;
   means for convolving said delayed data with even and odd numbered tap gains of said transversal filters to provide even (217) and odd (216) numbered convolution signals, respectively.
   means for delaying said data signals to provide data signals at first $(n\frac{1}{2})$ and second (n) times;
   first (226) means for providing a first difference signal between said even numbered convolution signal and said data signal at said first time;
   second (227) means for providing a second difference signal between said odd numbered convolution signal and said data signal at said second time; and
   means for obtaining the least mean square of said first and second difference signals, and for updating said even- and odd numbered tap gains in accordance therewith.

3. The receiver of claim 2 wherein said means for delaying said modulated data comprises:
   first delay means (204) for delaying said modulated data by one symbol period to produce a first in-phase signal; and
   second delay means (205) for delaying said first in-phase signal by one symbol interval for producing a second in-phase signal.

4. The receiver of claim 3 wherein said means for convolving comprises:
   means for shifting said first and second in-phase signals by 90° to produce first and second quadrature signals, respectively;
   means (208, 210) for multiplying said first in-phase signal with real components of selected tap gains;
   means (212, 214) for multiplying said second in-phase signal with real components of selected tap gains;
   means (209, 211) for multiplying said first quadrature signal with imaginary components of selected tap gains;
   means (213, 215) for multiplying said second quadrature signal with imaginary components of selected tap gains; and
   first and second means (216, 217) for combining selected outputs from (i) said means for multiplying said first in-phase signal, (ii) said means for multiplying said second in-phase signal, (iii) said means for multiplying said first quadrature signal, and (iv) said means for multiplying said second quadrature signal, to produce said even and odd-numbered convolution signals, respectively.

5. The receiver of claim 4 wherein said means for obtaining the least mean square of said first and second difference signals comprises:
- means (222, 223) for inverting said first and second quadrature signals to produce first and second inverted signals, respectively;
- first (228), second (229), third (230) and fourth (231) mixer means for multiplying said first difference signal by said first inverted signal, said first in-phase signal, said second inverted signal and said second in-phase signal, respectively;
- fifth (232), sixth (233), seventh (234) and eighth (235) mixer means for multiplying said second difference signal by said first inverted signal, said first in-phase signal, said second inverted signal and said second in-phase signal, respectively;
- and first through eighth filter means respectively connected to the outputs of said first through eighth mixer means to provide real and imaginary tap gains, whereby said even- and odd- numbered tap gains are updated in accordance with said real and imaginary tap gains.

* * * * *

UNITED STATES PATENT AND TRADEMARK OFFICE
CERTIFICATE OF CORRECTION

PATENT NO. : 4,271,525

DATED : June 2, 1981

INVENTOR(S) : Kojiro WATANABE

It is certified that error appears in the above—identified patent and that said Letters Patent is hereby corrected as shown below:

Column 3, line 68, delete "$W_{j,1}r,$" and insert -- $W^r_{j,1},$ -- .

Column 4, line 3, delete "$W_{j,3}r,$" and insert -- $W^r_{j,3},$ -- ;

line 7, delete "$W_{j,1}i,$" and insert -- $W^i_{j,1},$ -- ;

line 10, delete "$W_{j,3}i,$" and insert -- $W^i_{j,3},$ -- ;

line 22, delete "$X_{j,n1/2}$" and insert -- $X_{j,n-1/2}$ -- ;

same line, delete "n1/2" and insert -- n-1/2 -- ;

line 24, delete "$X_{j,n1/2}$" and insert -- $X_{j,n-1/2}$ -- ;

line 25, delete "$X_{j,n1/2}$" and insert -- $X_{j,n-1/2}$ -- ;

line 28, delete "$X_{j,n1/2}$" and insert -- $X_{j,n-1/2}$ -- .

UNITED STATES PATENT AND TRADEMARK OFFICE
CERTIFICATE OF CORRECTION

PATENT NO. : 4,271,525

DATED : June 2, 1981

INVENTOR(S) : Kojiro WATANABE

It is certified that error appears in the above—identified patent and that said Letters Patent is hereby corrected as shown below:

Column 4, line 67, delete "are" (second occurrence).

Signed and Sealed this

First Day of September 1981

[SEAL]

Attest:

GERALD J. MOSSINGHOFF

Attesting Officer

Commissioner of Patents and Trademarks